United States Patent [19]

Uyeda

[11] 3,901,945
[45] Aug. 26, 1975

[54] 1,1A,6,10B-TETRAHYDRODIBENZO (A,E) CYCLOPROPA (C) CYCLOHEPTEN-6-IMINES

[75] Inventor: Roy Teruyuki Uyeda, Wilmington, Del.

[73] Assignee: E. I. Du Pont de Nemours and Company, Wilmington, Del.

[22] Filed: Aug. 21, 1973

[21] Appl. No.: 389,629

Related U.S. Application Data

[63] Continuation-in-part of Ser. No. 294,796, Sept. 28, 1972, abandoned.

[52] U.S. Cl. ...... 260/566 R; 260/239 R; 260/239 A; 260/239 B; 260/239 BC; 260/243 B; 260/244 R; 260/247.5 B; 260/268 PC; 260/293.62; 260/293.85; 260/293.87; 260/309; 260/309.7; 260/310 D; 260/326.85; 260/326.82; 260/556 AR; 260/556 S; 260/33.8 UA; 260/247.1; 424/244; 424/246; 424/248; 424/250; 424/267; 424/269; 424/270; 424/272; 424/273; 424/274; 424/321; 424/325

[51] Int. Cl. .......................................... C07c 119/00
[58] Field of Search ........ 260/566 R, 239 A, 239 B, 260/243 B, 247.1, 247.5 B, 268 PC, 293.62, 293.85, 293.87, 326.82, 326.85, 556 AR, 556 S, 239 R, 239 BC, 244 R, 309, 309.7, 310 D

[56] References Cited
UNITED STATES PATENTS

| | | | |
|---|---|---|---|
| 3,574,199 | 4/1971 | Coyne et al. | 260/591 |
| 3,736,351 | 5/1973 | Rey-Bellet et al. | 260/566 R |
| 3,803,234 | 4/1974 | Dostert et al. | 260/566 R |

*Primary Examiner*—Gerald A. Schwartz
*Attorney, Agent, or Firm*—Anthony P. Mentis

[57] ABSTRACT

6-(Substituted imino)-1,1a,6,10b-tetrahydrodibenzo[a,e]cyclopropa[c]cycloheptenes are plasticizers for polyvinyl chloride polymers. Some of the compounds also have activity in the central nervous system of warm-blooded animals.

9 Claims, No Drawings

1,1A,6,10B-TETRAHYDRODIBENZO (A,E) CYCLOPROPA (C) CYCLOHEPTEN-6-IMINES

CROSS-REFERENCE TO RELATED APPLICATION

This application is a continuation-in-part of my co-pending commonly assigned application Ser. No. 294,796, filed Sept. 28, 1972, now abandoned.

BACKGROUND OF THE INVENTION

1. Field of the Invention

This invention relates to novel 6-(substituted imino)-1,1a,6,10b-tetrahydrodibenzo[a,e]cyclopropa[c]-cycloheptenes and their use as plasticizers for polyvinyl chloride resins or as drugs active in the central nervous system of warm-blooded animals.

2. Description of the Prior Art

The starting ketone for the synthesis of the imines of this invention, 1,1a,6,10b-tetrahydrodibenzo[a,e]-cyclopropa[c]cyclohepten-6-one is disclosed in U.S. Pat. No. 3,574,199.

Belgian patent 773,649 (Hoffman-LaRoche) discloses N-(aminoalkyl)dibenzocyclohepten and heterocyclic imine derivatives which have ethylene, vinylene, oxymethylene, thio or thiomethylene groups.

U.S. Pats. Nos. 3,547,933 and 3,658,908 relate to compounds having the same tetracyclic carbon skeleton but differing in the types of substituents in the 6-position; e.g., hydroxy or lower alkanoyloxy and various aminoalkyl groups.

U.S. Pat. No. 3,475,438 discloses compounds based on the tetracyclic carbon skeleton having aminoalkylidene groups in the 6-position.

U.S. Pat. No. 3,574,199 relates to compounds having the same basic skeleton in which the 6-substituents are aminoalkyl or aminoalkylidene groups.

STATEMENT OF THE INVENTION

It has been found that a compound having the formula

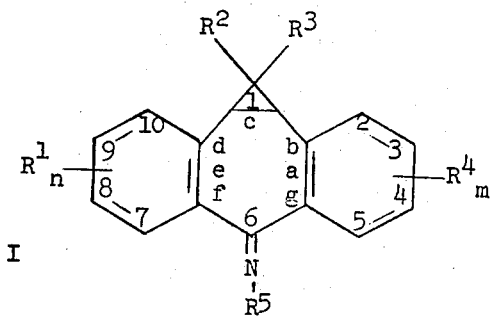

I wherein $R^1$ and $R^4$, alike or different, are selected from F, Cl, Br, alkyl and alkoxy or 1 through 4 carbon atoms, hydroxy, trifluoromethyl, methylthio, N,N-dimethylsulfonamido and methylsulfonyl and preferably one of $R^1$ and $R^4$ is hydrogen;

$n$ and $m$ are 0, 1 or 2;

$R^2$ and $R^3$, alike or different, are selected from H, F, Cl, and Br; and $R^5$ is selected from cyclic and acyclic aliphatic alkyl and alkenyl of 1 through 4 carbon atoms; aryl, aralkyl and alkaryl of 6-8 carbon atoms and aminoalkyl of the formula $-(CH_2)_pNR^6R^7$ in which $p$ is 1 through 5 and $R^6$ and $R^7$, alike or different, are individually selected from H, alkyl, alkenyl and hydroxyalkyl, or together with the nitrogen, form a 4- to 9-membered ring having up to one additional N, O or S heteroatom with the proviso that the sum of $R^6$ and $R^7$ does not total more than 8 carbon atoms; said cyclic groups specifically including azetidino, pyrrolidino, dihydropropyrrolino, pyridino, tetrahydropyridino, piperidino, piperazino, N-alkyl or hydroxyalkylpiperazino, morpholino, thiomorpholino, azepino, azocino and azonino, is a plasticizer for polyvinyl chloride resins. Certain compounds conforming to the formula also have activity in the central nervous system of warm blooded animals.

The compounds are prepared by simple heating, or heating in the presence or a dehydrating agent a ketone of formula II with a primary amine according to the reaction scheme

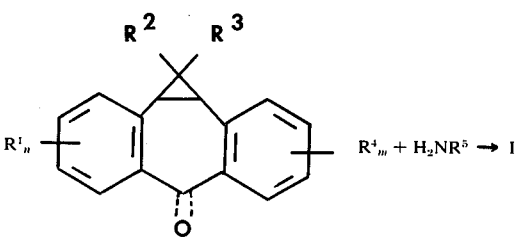

II  $R^1{}_n$ ———  $R^4{}_m$ + $H_2NR^5$ → I wherein the values of the R groups are as previously given.

The two compounds are heated to a temperature at which no decomposition takes place, 120°–180°C. This thermal reaction should be conducted in an inert atmosphere.

The ketone and amine can also be combined with the aid or a dehydrating agent: molecular sieves, and Lewis acids, particularly the halides of an element from Groups III, IV, V and VIII of the Periodic Table. Titanium tetrachloride and antimony trichloride are preferred. When the condensation is performed in the presence of a Lewis acid, the condensing agent is added to the two reactants in a solvent in a temperature range of 25°–200° (preferably, 25°–100°C) for times of several hours to several days. The reaction should be carried out in an inert atmosphere, such as nitrogen or argon, and under anhydrous conditions.

The solvent depends on the solubility or the two compounds. When titanium tetrachloride is used as the condensing agent, hexamethylphosphoramide, aromatic hydrocarbon, or an aliphatic ether is a suitable solvent. After the imine is formed, it is separated by removal of the titanium compound by alkaline aqueous extraction and purified.

The compounds of the invention can generally exist in two isomeric forms due to the imino double bond. Both are active for the uses of this invention. The imino group is sufficiently acidic to form acid addition salts which increases water solubility and these constitute a portion of the invention.

The nuclearly substituted 1,1-dichloro-1,1a,6,10b-tetrahydrodibenzo[a,d]cyclopropa[c]cyclohepten-6-ones used as starting materials can be prepared by treating the respective 5H-dibenzo[a,d]cyclohepten-5-ones under anhydrous conditions with sodium methoxide and ethyltrichloroacetate or heating at reflux a benzene solution of the ketone and phenyltrichloromethyl mercury to form the respective 1,1-dichloro-1,1a,6,10b-tetrahydrodibenzo[a,e]cyclopropa[c]cyclohepten-6-ones of the general formula:

III 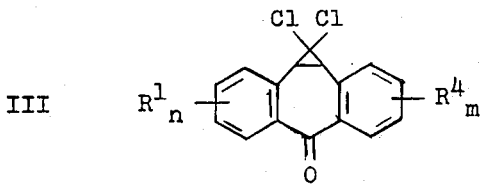

and subsequently reducing the dichloroketone to the corresponding carbinol by treatment in solution with sodium borohydride to produce the alcohol. The gem chlorines and any halogen on the benzene rings can be replaced with hydrogen by treatment of the dichloroalcohol with lithium and tert.-butanol followed by oxidation with chromium trioxide in sulfuric acid or chromium trioxide in pyridine to form the starting materials:

IV 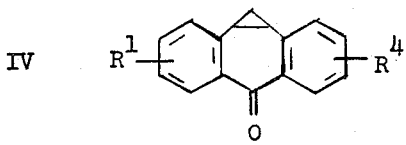

wherein $R^1$ and $R^4$ are as defined above.

The basic starting material, 5H-dibenzo[a,d]cyclohepten-5-one is commercially available. Synthesis of the benzo-substituted analogs may be carried out by adaptation of the synthesis procedures shown in:

A. C. Cope et al., J. Am. Chem. Soc. 73, 1673 (1951)
W. Treibs et al., Ber. 84, 671 (1951)
S. O. Winthrop et al., J. Org. Chem. 27, 230 (1962).

SPECIFIC EMBODIMENTS OF THE INVENTION

In the illustrative examples below all parts are by weight unless stated otherwise.

EXAMPLE 1

N-(2-Dimethylaminoethyl)-1,1-dichloro-1,1a,6,10b-tetrahydrodibenzo[a,e]cyclopropa[c]cyclohepten-6-imine (1)

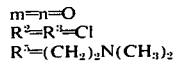

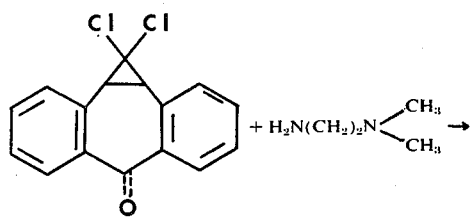

A

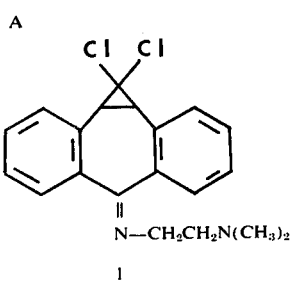

1

A solution of 1 ml of titanium tetrachloride in 1 ml of anhydrous benzene was added slowly, under nitrogen to a stirred, ice-bath cooled mixture of 3 g (0.01 mole) of 1,1-dichloro-1,1a,6,10b-tetrahydrodibenzo[a,e]cyclopropa[c]-cyclohepten-6-one (A), 11 ml (0.1 mole) of unsym. -N,N-dimethylenediamine, and 12 ml of anhydrous hexamethylphosphoramide. After stirring at room temperature for 8 days, the mixture was cooled and poured into a cooled mixture of ether and sodium hydroxide solution, then filtered through Celite.

The layers of the filtrate were separated and the ether solution was washed with saturated sodium chloride solution, then extracted several times with cold 5% hydrochloric acid. The combined acid extracts were washed with cold ether, then treated with an excess or cold sodium hydroxide solution. The oil was extracted with ether and dried. Removal of the solvent and short path distillation at bath temperature of 160°C. and 0.1 μ pressure gave 1.6 g of N-(2-dimethylaminoethyl)-1,1-dichloro-1,1a,6,10b-tetrahydrodibenzo[a,e]cyclopropa[c]cyclohepten-6-imine (1) as a viscous oil. NMR spectrum (in $CDCl_3$): multiplet at δ 6.9-7.6 (8H); singlet superimposed on a multiplet at 3.3-3.9 (4H); triplet at 2.7 (2H) and a singlet at 2.2 (6H).

EXAMPLE 2

N-(3-Dimethylaminopropyl)-1,1-dichloro-1,1a,6,10b-tetrahydrodibenzo[a,e]cyclopropa[c]cyclohepten-6-imine (2)

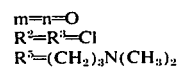

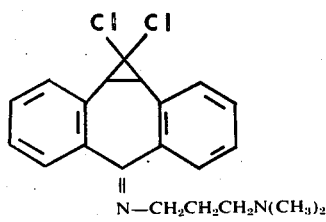

2

Using the procedure of Example 1, a mixture of 3 g of 1,1-dichloro-1,1a,6,10b-tetrahydrodibenzo[a,e]cyclopropa[c]cyclohepten-6-one (A), 10 ml of N,N-dimethyl-1,3-propanediamine and 12 ml of anhydrous hexamethylphosphoramide was treated with 1 ml or titanium tetrachloride in 1 ml of anhydrous benzene. The mixture was worked up after stirring at room temperature for 8 days. Shortpath distillation of the product at 160°-170°C. bath temperature and 0.1 μ pressure gave 2 g of N-(3-dimethylaminopropyl)-1,1-dichloro-1,1a,6,10-tetrahydrodibenzo[a,e]cyclopropa[c]cyclohepten-6-imine (2) as a viscous oil NMR spectrum (in $CDCl_3$): multiplet at δ 7.0-7.6 (8H); singlet superimposed on a multiplet at 3.3-3.9 (4H); singlet on a multiplet at 1.6-2.9 (10H).

Anal. Calcd. for $C_{21}H_{22}N_2Cl_2$: C, 67.56; H, 5.94; N, 7.50; Cl, 18.99; Found: C, 67.40; H, 5.89; N, 6.70; Cl, 18.98.

The 1,1-dichloro-1,1a,6,10b-tetrahydrodibenzo[a,e]cyclopropa[c]cyclohepten-6-one used above can be prepared by addition of dichlorocarbene to 5-H-dibenzo[a,d]cyclohepten-6-one by literature procedures.

EXAMPLE 3

N-(2-Dimethylaminoethyl)-1,1a,6,10b-tetrahydrodibenzo[a,e]cyclopropa[c]cyclohepten-6-imine (3)

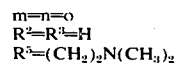

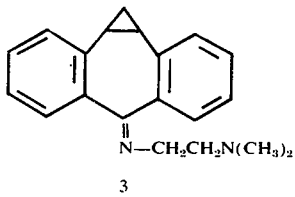

Following the procedure of Example 1, a mixture of 4 g of 1,1a,6,10b-tetrahydrodibenzo[a,e]cyclopropa[c]cyclohepten-6-one, 10 ml of unsym. -N,N-dimethylethylenediamine and 10 ml of anhydrous hexamethylphosphoramide (HMPA) was treated with 2 ml of titanium tetrachloride in 2 ml of dry benzene. The mixture was worked up after stirring at room temperature for 12 days. Short-path distillation or the product at 160°C. bath temperature and 0.1 μ pressure gave 2 g of N-(2-dimethylaminoethyl)-1,1a,6,10b-tetrahydrodibenzo[a,e]cyclopropa[c]cyclohepten-6-imine (3) as a viscous oil. The nmr spectrum (in CDCl₃): multiplet at δ 6.7–7.5 (8H); triplet (J = 7 Hz) at 3.6 (2H); singlet superimposed upon a multiplet at 1.9–2.9 (10H) and multiplet at 1.0–1.8 (2H).

Anal. Calcd. for $C_{20}H_{22}N_2$: C, 82.72; H, 7.64; N, 9.65; Found: C, 82.58; H, 7.61; N, 9.70.

EXAMPLE 4

N-(2-Dimethylaminoethyl)-1,1a,6,10b-tetrahydrodibenzo[a,e]cyclopropa[c]cyclohepten-6-imine Maleate (4)

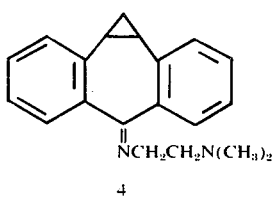

To 4.5 g (15.5 mmoles) of N-(2-dimethylaminoethyl-1,1a,6,10b-tetrahydrodibenzo[a,e]cyclopropa[c]cyclohepten-6-imine (3) in 10 ml of warm acetonitrile was added a warm solution of 1.8 g (15.5 mmoles) of maleic acid in 10 ml of acetonitrile. The solution was seeded and left overnight at 25°C to yield 4.4 g of white crystals. Recrystallization from acetonitrile gave 3.7 g of product (4), mp 153°–154°. NMR spectrum (in CDCl₃): Very broad absorption at δ 12.5–16.0 (2H), multiplet at 6.7–7.5 (8H), singlet at 6.1 (2H), multiplet at 3.5–4.3 (2H), multiplet at 3.0–3.5 (2H), singlet at 2.8 (6H), multiplet at 2.2–2.7 (2H), and multiplet at 1.0–2.1 (2H).

Anal. Calcd for $C_{24}H_{26}N_2O_4$: C, 70.92; H, 6.45; N, 6.89; Found: C, 70.91; H, 6.34; N, 6.87.

EXAMPLE 5

N-(2-Methylaminoethyl)-1,1a,6,10b-tetrahydrodibenzo[a,e]cyclopropa[c]cyclohepten-6-imine (5)

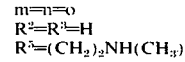

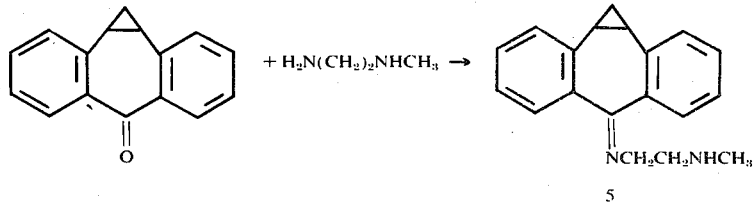

The procedure of Example 1 with the following modification was used.

1,1a,6,10b-Tetrahydrodibenzo[a,e]cyclopropa[c]cyclohepten-6-one (B) 2 g; N-methylethylenediamine 10 ml; HMPA 10 ml; and titanium tetrachloride 1.2 ml in 1.2 ml of anhydrous benzene. Reaction time: 5 days; reaction temperature, 55°C. The product (5) was flash distilled at bath temperature of 160° and 0.1 μ. NMR spectrum (in CDCl₃): multiplet at δ 6.9–7.6 (8H), multiplet at 3.2–4.1 (2H); multiplet at 2.6–3.1 (2H), singlet at 2.3 superimposed on a multiplet at 2.1–2.6 (5H), and a multiplet at 1.1–1.8 (3H).

EXAMPLE 6

N-(2-Methylaminoethyl)-1,1a,6,10b-tetrahydrodibenzo[a,e]cyclopropa[c]cyclohepten-6-imine Maleate(6)

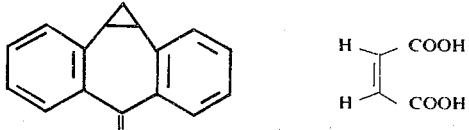

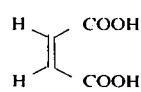

The procedure of Example 4 was used. To 0.88 g (3.2 mmoles) of N-(2-methylaminoethyl)-1,1a,6,10b-tetrahydrodibenzo[a,e]cyclopropa[c]cyclohepten-6-imine (5) in 2 ml of warm acetonitrile was added 0.37 g (3.2 mmoles) of maleic acid in 3 ml of warm acetonitrile and the solution was allowed to stand at 25°C overnight. The white product (6) was recrystallized from acetonitrile to give 1.1 g of the imine maleate, mp 164°–165° (dec).

Anal. Calcd for $C_{23}H_{24}N_2O_4$: C, 70.73; H, 6.16; N, 7.14; Found: C, 70.53; H, 5.93; N, 7.18.

EXAMPLE 7

N-Cyclopropylmethyl-1,1a,6,10b-tetrahydrodibenzo[a,e]cyclopropa[c]cyclohepten-6-imine (7)

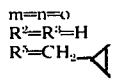
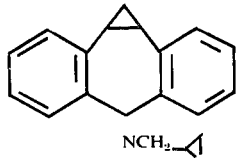

The procedure of Example 1 with the following modifications was used.

1,1a,6,10b-Tetrahydrodibenzo[a,e]cyclopropa[c]cyclohepten-6-one 2 g; cyclopropylmethylamine 10 ml; HMPA 10 ml; and titanium tetrachloride 1.25 ml in 1.25 ml of dry benzene. Reaction time: 14 days; reaction temperature, 55°. The product (7) was recrystallized from n-hexanecyclohexane to give 1.3 g of white crystals, mp 119°–120°. NMR spectrum (in $CDCl_3$): multiplet at δ 7.8–8.7 (8H), an AB pattern, each further split at 3.9–4.8 (2H), multiplet at 3.2–3.6 (2H), multiplet at 1.8–2.9 (3H) and multiplet at 0.83–1.6 (4H).

Anal. Calcd for $C_{20}H_{19}N$: C 87.87; H, 7.01; N, 5.12; Found: C, 88.12; H, 6.82; N, 4.96.

EXAMPLE 8

N-(2-Piperidinoethyl)-1,1a,6,10b-tetrahydrodibenzo[a,e]cyclopropa[c]cyclophepten-6-imine (8)

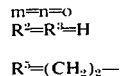
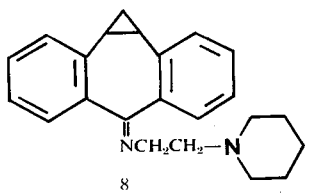

The procedure of Example 1 with the following modifications was used: 1,1a,6,10b-tetrahydrodibenzo[a,e]cyclopropa[c]cyclohepten-6-one 2 g; N-(2-aminoethyl)piperidine 10 ml; HMPA 10 ml; and titanium tetrachloride 1.25 ml in 1 ml of dry benzene. Reaction time: 6.5 days; reaction temperature, 85°C. The product was flash distilled at bath temperature of 205° and 0.1 μ pressure to give 1.7 g of N-(2-piperidinoethyl)-1,1a,6,10b-tetrahydrodibenzo[a,e]cyclopropa[c]cyclohepten-6-imine (8). The nmr spectrum (in $CDCL_3$): multiplet at δ 6.8–7.6 (8H), multiplet at 3.5–4.0 (2H), multiplet at 2.0–3.0 (8H), and multiplet at 1.0–1.9 (8H).

Anal. Calcd for $C_{23}H_{26}N_2$: C, 83.59; H, 7.93; N, 8.48; Found: C, 83.38; H, 7.95; N, 8.35.

In Examples 9-18 reaction of 1,1a,6,10b-tetrahydrodibenzo[a,e]cyclopropa[c]cyclohepten-6-one (B) with the recited amino compound gives the indicated product.

EXAMPLE 9

N-(2-Aminoethyl)piperazine gave N-(2-piperazinoethyl)-1,1a,6,10b-tetrahydrodibenzo[a,e]cyclopropa[c]cyclohepten-6-imine (9).

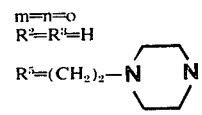
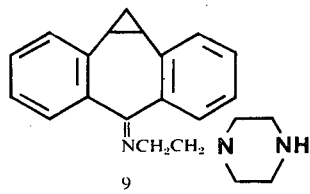

The nmr spectrum (in $CDCl_3$): multiplet at δ 6.8–7.5 (8H), triplet at 3.5–3.9 (2H), multiplet at 2.0–3.0 (12H), multiplet at 1.4–1.9 (3H, one proton was exchangeable with $D_2O$).

EXAMPLE 10

3-Dimethylaminopropylamine gave N-(3-dimethylaminopropyl)-1,1a,6,10b-tetrahydrodibenzo[a,e]cyclopropa[c]cyclohepten-6-imine (10).

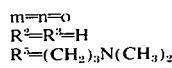

The nmr spectrum (in $CDCl_3$): multiplet at δ 6.8–7.6 (8H), multiplet at 3.0–4.0 (2H), multiplet at 1.2–2.9 (14H). Anal. Calcd for $C_{21}H_{24}N_2$: C, 82.85; H, 7.95; N, 9.20; Found: C, 83.10; H, 8.20; N, 9.08.

EXAMPLE 11

N-(2-Aminoethyl)pyrrolidine gave N-(2-pyrrolidinoethyl)-1,1a,6,10b-tetrahydrodibenzo[a,e]cyclopropa[c]cyclohepten-6-imine (11).

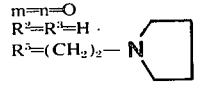

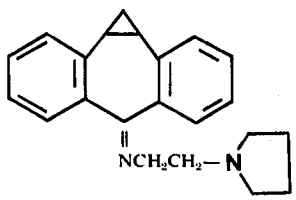

11

The nmr spectrum (in CDCl₃): multiplet at δ 6.8–7.5 (8H), triplet at 3.5–4.0 (2H), multiplet at 2.0–3.3 (8H), 1.1–2.0 (6H).

Anal. Calcd for $C_{22}H_{24}N_2$: C, 83.50; H, 7.64; N, 8.85; Found: C, 83.52; H, 7.78; N, 8.79.

EXAMPLE 12

N-(3-Aminopropyl)morpholine gave N-[3-(morpholinopropyl)-1,1a,6,10b-tetrahydrodibenzo[a,e]cyclopropa[c]cyclohepten-6-imine (12).

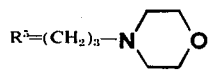
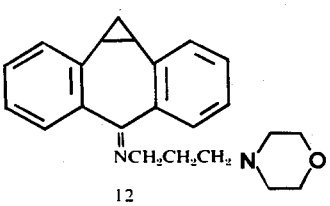

12

The nmr spectrum (in CDCl₃): multiplet at δ 6.8–7.5 (8H), multiplet at 3.1–3.9 (6H), multiplet at 1.2–3.0 (12H).

Anal. Calcd for $C_{23}H_{26}N_2O$: C, 79.73; H, 7.56; N, 8.09; Found: C, 79.45; H, 7.84; N, 8.15.

EXAMPLE 13

N-(2-Aminoethyl)morpholine gave N-(2-morpholinoethyl)-1,1a,6,10b-tetrahydrodibenzo[a,e]cyclopropa[c]cyclohepten-6-imine (13).

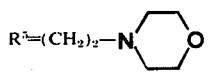
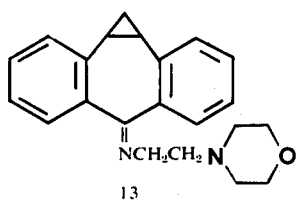

13

The nmr spectrum (in CDCl₃): multiplet at δ 6.8–7.5 (8H), multiplet at 3.4–3.9 (6H), multiplet at 2.0–3.0 (8H), and multiplet at 1.3–1.9 (2H).

Anal. Calcd for $C_{22}H_{24}N_2O$: C, 79.48; H, 7.28; N, 8.43; Found: C, 78.98; H, 7.45; N, 8.56.

EXAMPLE 14

N,N-Diethylethylenediamine gave N-(2-diethylaminoethyl)-1,1a,6,10b-tetrahydrodibenzo[a,e]cyclopropa[c]cyclohepten-6-imine (14).

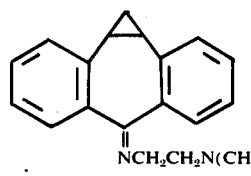

14

The nmr spectrum (in CDCl₃): multiplet at δ 6.8–7.5 (8H), multiplet at 3.5–3.9 (2H), multiplet at 2.2–3.1 (8H), multiplet at 1.4–1.9 (2H), and triplet (J = 7 Hz) at 1.0 (6H).

EXAMPLE 15

N-Ethylethylenediamine gave N-(2-ethylaminoethyl)-1,1a,6,10b-tetrahydrodibenzo[a,e]cyclopropa[c]cyclohepten-6-imine (15).

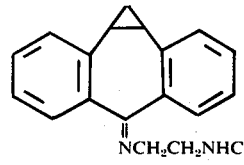

15

The nmr spectrum (in CDCl₃): multiplet at δ 6.9–7.5 (8H), multiplet at 3.4–4.0 (2H), multiplet at 2.2–3.2 (6H), multiplet at 1.3–1.9 (3H, one proton exchangeable with D₂O) and triplet (J = 7 Hz) at 1.1 (3H).

EXAMPLE 16

3-Diethylaminopropylamine gave N-(3-diethylaminopropyl)-1,1a,6,10b-tetrahydrodibenzo[a,e]cyclopropa[c]cyclohepten-6-imine (16).

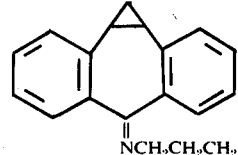

16

The nmr spectrum (in CDCl₃): multiplet at δ 6.9–7.5 (8H), multiplet at 3.3–3.9 (2H), multiplet at 1.3–2.9 (12H), and triplet (J = 7 Hz) at 1.0 (6H).

EXAMPLE 17

N-Methyl-1,3-propanediamine gave N-(3-methylaminopropyl)-1,1a,6,10b-tetrahydrodibenzo[a,e]cyclopropa[c]cyclohepten-6-imine (17).

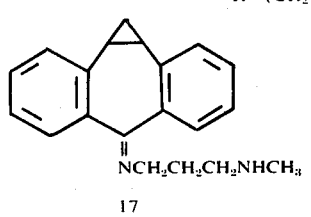

m=n=O
R²=R⁴=H
R³=(CH₂)₃NHCH₃

NCH₂CH₂CH₂NHCH₃

17

The nmr spectrum (in CDCl₃): multiplet at δ 6.8–7.5 (8H), multiplet at 3.3–3.9 (2H), multiplet at 1.3–2.9 (11H), and singlet at 1.2 (1H, exchangeable with D₂O).

EXAMPLE 18

2-Aminoethanol gave N-(2-hydroxyethyl)-1,1a,6,10b-tetrahydrodibenzo[a,e]cyclopropa[c]cyclohepten-6-imine (18).

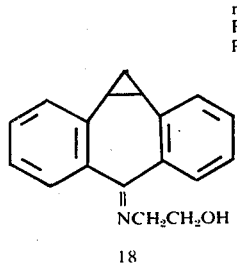

m=n=O
R²=R⁴=H
R³=(CH₂)₂OH

NCH₂CH₂OH

18

Melting point was 123°–124°C. The nmr spectrum (in CDCl₃): multiplet at δ 6.8–7.5 (8H), multiplet at 3.4–3.9 (5H, one proton exchangeable with D₂O), triplet (J = 7 Hz) at 2.3 (2H) and multiplet at 1.3–1.9 (2H).

EXAMPLE 19

1-Chloro-N-(2-dimethylaminoethyl)-1-chloro-1,1a,6,10b-tetrahydrodibenzo[a,e]cyclopropa[c]cyclohepten-6-imine (19)

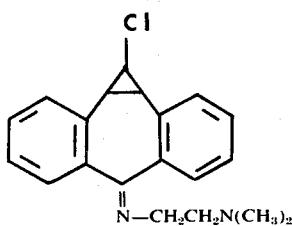

m=n=O
R²=H
R⁴=Cl
R³=(CH₂)₂N(CH₃)₂

N—CH₂CH₂N(CH₃)₂

A solution of 4 ml of titanium tetrachloride in 3 ml of dry benzene was added slowly to a solution of 4 g of 1-chloro-1,1a,6,10b-tetrahydrodibenzo[a,e]cyclopropa[c]cyclohepten-6-one in 10 ml of dry hexamethylphosphoramide and 30 ml of N,,N-dimethylethylenediamine at 25°C. The mixture was stirred at 60° for 6 days, then cooled and poured into a cooled mixture of benzene and aqueous sodium hydroxide, then filtered through Celite. The organic layer of the filtrate was separated and washed with diethyl ether methyl chlorine mixture, then added to 400 ml of 10% base. The oil was extracted with ether, dried and the solvent removed to yield 1.8 g of N-(2-dimethylaminoethyl)-1-chloro-1,1a,6,10b-tetrahydrodibenzo[a,e]cyclopropa[c]cyclohepten-6-imine (19); nmr (CDCl₃): δ 6.9–7.5 (m, 8), 3.3–3.9 (m, 3), 2.5–2.9 (m, 4), 2,2 (s, 6).

An alternative method for the synthesis of N-(substituted)-1,1a,6,10b-tetrahydrodibenzo[a,e]cyclopropa[c]cyclohepten-6-imine is: Treatment of 5,5-dichloro5H-dibenzocycloheptene [prepared by the method of J. J. Looker, J. Org. Chem., 31, 3599 (1966)]with sodium methoxide to give the known 5H-dibenzo[a,d]cyclohepten-5-dimethylketal. Reaction of this ketal with ethyltrichloroacetate and sodium methoxide or phenyl(trichloromethyl)mercury can give 1,1-dichloro-1,1a,6,10b-tetrahydrodibenzo[a,e]cyclopropa[c]cyclohepten-6-dimethylketal. The replacement of the chlorine with hydrogen was accomplished with lithium hydride-triethylborane in HMPA at 100° to give 1,1a,6,10b-tetrahydrodibenzo[a,e]cyclopropa[c]cyclohepten-6-dimethylketal. The imine can be obtained by heating the ketal and amine in the presence of an acid or Lewis acid.

Analogs of the above products can be prepared similarly. Thus, the nuclearly substituted 1,1a,6,10b-tetrahydrodibenzo[a,e]cyclopropa[c]cyclohepten-6-ones in column 1 of Table I react with 2-dimethylaminoethylamine to yield the products in column 2 of Table I.

TABLE I

| | Starting Ketone | Imine Product |
|---|---|---|
| 1. | 4-Chloro-1,1a,6,10b-tetrahydrodibenzo-[a,e]cyclopropa[c]cyclohepten-6-one | 4-Chloro-N-(2-dimethylaminoethyl)-1,1a,6,10b-tetrahydrodibenzo[a,e]-cyclopropa[c]cyclohepten-6-imine |
| 2. | 4-Bromo-1,1a,6,10b-tetrahydrodibenzo-[a,e]cyclopropa[c]cyclohepten-6-one | 4-Bromo-N-(2-dimethylaminoethyl)-1,1a,6,10b-tetrahydrodibenzo[a,e]-cyclopropa[c]cyclohepten-6-imine |
| 3. | 4-Trifluoromethyl-1,1a,6,10b-tetrahydrodibenzo[a,e]cyclopropa[c]cyclohepten-6-one | 4-Trifluoromethyl-N-(2-dimethylaminoethyl)-1,1a,6,10b-tetrahydrodibenzo[a,e]cyclopropa[c]cyclohepten-6-imine |
| 4. | 4-Methyl-1,1a,6,10b-tetrahydrodibenzo- | 4-Methyl-N-(2-dimethylaminoethyl)- |

TABLE I — Continued

| Starting Ketone | Imine Product |
|---|---|
| [a,e]cyclopropa[c]cyclohepten-6-one | 1,1a,6,10b-tetrahydrodibenzo[a,e]-cyclopropa[c]cyclohepten-6-imine |
| 5. 4-Methylsulfonyl-1,1a,6,10b-tetra-hydrodibenzo[a,e]cyclopropa[c]cyclo-hepten-6-one | 4-Methylsulfonyl-N-(2-dimethylamino-ethyl)-1,1a,6,10b-tetrahydrodibenzo-[a,e]cyclopropa[c]cyclohepten-6-imine |
| 6. 3,4-Dimethoxy-1,1a,6,10b-tetrahydro-dibenzo[a,e]cyclopropa[c]cyclohepten-6-one | 3,4-Dimethoxy-N-(2-dimethylaminoethyl)-1,1a,6,10b-tetrahydrodibenzo[a,e]cyclo-propa[c]cyclohepten-6-imine |

When the amines in column 1 of Table II react with 1,1a,6,10b-tetrahydrodibenzo[a,e]cyclopropa[c]cyclohepten-6-one, the N-(substituted)-1,1a,6,10b-tetrahydrodibenzo[a,e]cyclopropa[c]cyclohepten-6-imines of column 2 are formed.

TABLE II

| Amine | Imine Product |
|---|---|
| Methylamine | N-Methyl-1,1a,6,10b-tetrahydrodibenzo[a,e]cyclopropa-[c]cyclohepten-6-imine |
| Cyclopropylmethylamine | N-Cyclopropylmethyl-1,1a,6,10b-tetrahydrodibenzo[a,e]-cyclopropa[c]cyclohepten-6-imine |
| 3-Dimethylaminopropylamine | N-(3-Dimethylaminopropyl)-1,1a,6,10b-tetrahydrodi-benzo[a,e]cyclopropa[c]cyclohepten-6-imine |
| 2-(2-Aminoethyl)pyridine | N-[2-(2-Pyridylethyl)]-1,1a,6,10b-tetrahydrodibenzo-[a,e]cyclopropa[c]cyclohepten-6-imine |
| 4-(2-Aminoethyl)morpholine | N-[2-(Morpholinoethyl)]-1,1a,6,10b-tetrahydrodibenzo-[a,e]cyclopropa[c]cyclohepten-6-imine |
| Allylamine | N-Allyl-1,1a,6,10b-tetrahydrodibenzo[a,e]cyclopropa-[c]cyclohepten-6-imine |
| 2-Aminoethanol | N-(2-Hydroxyethyl)-1,1a,6,10b-tetrahydrodibenzo[a,e]-cyclopropa[c]cyclohepten-6-imine |
| 3-Aminopropanol | N-3(Hydroxypropyl)-1,1a,6,10b-tetrahydrodibenzo[a,e]-cyclopropa[c]cyclohepten-6-imine |
| 2-Amino-5-(diethylamino)-pentane | N-[4-(Diethylamino)-2-pentyl]-1,1a,6,10b-tetrahydro-dibenzo[a,e]cyclopropa[c]cyclohepten-6-imine |
| N,N-Dimethyltetramethylene-diamine | N-(4-Dimethylaminobutyl)-1,1a,6,10b-tetrahydrodi-benzo[a,e]cyclopropa[c]cyclohepten-6-imine |
| N-Methylethylenediamine | N-(2-Methylaminoethyl)-1,1a,6,10b-tetrahydrodibenzo-[a,e]cyclopropa[c]cyclohepten-6-imine |
| 2-(diallylamino)ethylamine | N-(2-Diallylaminoethyl)-1,1a,6,10b-tetrahydrodibenzo-[a,e]cyclopropa[c]cyclohepten-6-imine |
| N-(3-Aminopropyl)pyrrolidine | N-(3-Pyrrolidonopropyl)-1,1a,6,10b-tetrahydrodibenzo-[a,e]cyclopropa[c]cyclohepten-6-imine |
| N-(3-Aminopropyl)azonine | N-(3-Azoninopropyl)-1,1a,6,10b-tetrahydrodibenzo-[a,e]cyclopropa[c]cyclohepten-6-imine |
| N-(2-Aminoethyl)piperidine | N-(2-Piperidinoethyl)-1,1a,6,10b-tetrahydrodibenzo-[a,e]cyclopropa[c]cyclohepten-6-imine |
| N-(2-Aminoethyl)piperazine | N-(2-Piperazinoethyl)-1,1a,6,10b-tetrahydrodibenzo-[a,e]cyclopropa[c]cyclohepten-6-imine |
| N-Methyl-N'-(2-aminoethyl)-piperazine | N-[2-(4-Methylpiperazino)ethyl]-1,1a,6,10b-tetrahydro-dibenzo[a,e]cyclopropa[c]cyclohepten-6-imine |
| N-(2-Hydroxyethyl)-N'-(2-aminoethyl)piperazine | N-(2-[4-(2-Hydroxyethyl)piperazinoethyl]-1,1a,6,10b-tetrahydrodibenzo[a,e]cyclopropa[c]cyclohepten-6-imine |
| N-(2-Aminoethyl)aziridine | N-(2-Aziridinoethyl)-1,1a,6,10b-tetrahydrodibenzo-[a,e]cyclopropa[c]cyclohepten-6-imine |
| N-(2-Aminoethyl)thiomor-pholine | N-(2-Thiomorpholinoethyl)-1,1a,6,10b-tetrahydrodibenzo-[a,e]cyclopropa[c]cyclohepten-6-imine |
| 3-Amino-N-ethylpiperidine | N-[3-(N-Ethylpiperidinyl)]-1,1a,6,10b-tetrahydrodibenzo[a,e]cyclopropa[c]cyclo-hepten-6-imine |
| 2-(2-Aminoethyl)pyridine | N-[2-(2-Pyridino)ethyl]-1,1a,6,10b-tetrahydrodibenzo[a,e]cyclopropa[c]cyclo-hepten-6-imine |
| 2-Amino-5-N,N-diethyl-aminopentane | N-[4-(Diethylamino)-2-pentyl]-1,1a,6,10b-tetrahydrodibenzo[a,e]cyclopropa[c]cyclo-hepten-6-imine |
| N-Phenylethylenediamine | N-(2-Phenylaminoethyl)-1,1a,6,10b-tetra-hydrodibenzo[a,e]cyclopropa[c]cyclohepten-6-imine |
| Benzylamine | N-Benzyl-1,1a,6,10b-tetrahydrodibenzo[a,e]cyclopropa[c]cyclohepten-6-imine |
| Phenethylamine | N-(2-Phenethyl)-1,1a,6,10b-tetrahydrodi-benzo[a,e]cyclopropa[c]cyclohepten-6-imine |
| Aniline | N-Phenyl-1,1a,6,10b-tetrahydrodibenzo[a,e]-cyclopropa[c]cyclohepten-6-imine |
| o-Toluidine | N-(o-Tolyl)-1,1a,6,10b-tetrahydrodibenzo-[a,e]cyclopropa[c]cyclohepten-6-imine |
| m-Toluidine | N-(m-Tolyl)-1,1a,6,10b-tetrahydrodibenzo-[a,e]cyclopropa[c]cyclohepten-6-imine |
| o, m, p-Anisidine | N-(o,m,p-Methoxyphenyl-1,1a,6,10b-tetrahydro-dibenzo[a,e]cyclopropa[c]cyclohepten-6-imine |
| p-Toluidine | N-(p-Tolyl)-1,1a,6,10b-tetrahydrodibenzo-[a,e]cyclopropa[c]cyclohepten-6-imine |
| 2,3-Dimethylaniline | N-(2,3-Dimethylphenyl)-1,1a,6,10b-tetrahydrodibenzo[a,e]cyclopropa[c]cyclo-hepten-6-imine |

TABLE II—Continued

| Amine | Imine Product |
|---|---|
| 2,4-Dimethylaniline | N-(2,4-Dimethylphenyl)-1,1a,6,10b-tetra-hydrodibenzo[a,e]cyclopropa[c]cyclohepten-6-imine |
| 2,5-Dimethylaniline | N-(2,5-Dimethylphenyl)-1,1a,6,10b-tetrahydro-dibenzo[a,e]cyclopropa[c]cyclohepten-6-imine |
| 3,4-Dimethylaniline | N-(3,4-Dimethylphenyl)-1,1a,6,10b-tetrahydro-dibenzo[a,e]cyclopropa[c]cyclohepten-6-imine |
| 3,5-Dimethylaniline | N-(3,5-Dimethylphenyl)-1,1a,6,10b-tetrahydro-dibenzo[a,e]cyclopropa[c]cyclohepten-6-imine |
| p-Dimethylaminotoluidine | N-(p-Dimethylaminotolyl)-1,1a,6,10b-tetrahydro-dibenzo[a,e]cyclopropa[c]cyclohepten-6-imine. |

When the nuclear substituted 1,1-dichloro-1,1a,6,10b-tetrahydrodibenzo[a,e]cyclopropa[c]cyclohepten-6-ones of Formula III are subjected to reaction with 2-dimethylaminoethylamine, one obtains the imines of Formula V as shown in Table III.

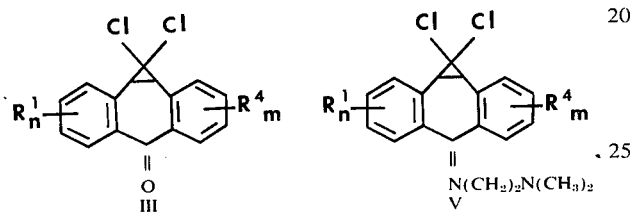

TABLE III

1. $n = 0$; $R^4 = 4-Cl$; $m = 1$     $n = 0$; $R^4 = 4-Cl$; $m = 1$
2. $n = 0$; $R^4 = 4-Br$; $m = 1$     $n = 0$; $R^4 = 4-Br$; $m = 1$
3. $n = 0$; $R^4 = 4-CF_3$; $m = 1$     $n = 0$; $R^4 = 4-CF_3$; $m = 1$
4. $n = 0$; $R^4 = 4-CH_3$; $m = 1$     $n = 0$; $R^4 = 4-CH_3$; $m = 1$
5. $n = 0$; $R^4 = 4-CH_3S$; $m = 1$     $n = 0$; $R^4 = 4-CH_3S$; $m = 1$
6. $n = 0$; $R^4 = 4-CH_3SO_2$; $m = 1$     $n = 0$; $R^4 = 4-CH_3SO_2$; $m = 1$
7. $n = 0$; $R^4 = 4-(CH_3)_2NSO_2$; $m = 1$     $n = 0$; $R^4 = 4-(CH_3)_2NSO_2$; $m = 1$
8. $n = 0$; $R^4 = 3,4-CH_3O-$; $m = 2$     $n = 0$; $R^4 = 3,4-CH_3O-$; $m = 2$

Reaction of the amines in column 1 of Table IV with 1,1-dichloro-1,1a,6,10b-tetrahydrodibenzo[a,e]cyclopropa[c]-cyclohepten-6-ones III yields the imines of formula VI in which $R^5$ is as shown in column 2 of Table IV.

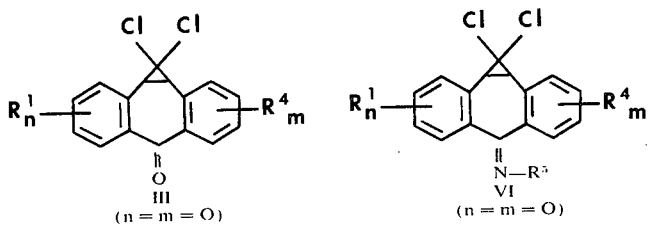

TABLE IV

| | Amine | $R^5$ |
|---|---|---|
| 1. | CH₃NH₂ | CH₃— |
| 2. | ▷—CH₂NH₂ | ▷—CH₂— |
| 3. | [piperidine]N(CH₂)₂NH₂ | [piperidine]N(CH₂)₂— |
| 4. | O[morpholine]N(CH₂)₂NH₂ | O[morpholine]N(CH₂)₂— |
| 5. | HOCH₂CH₂NH₂ | HOCH₂CH₂— |
| 6. | HO(CH₂)₃NH₂ | HO(CH₂)₃— |
| 7. | CH₃CH(NH₂)(CH₂)₃N(C₂H₅)₂ | (C₂H₅)₂N(CH₂)₃CHCH₃— |
| 8. | H₂N(CH₂)₄N(CH₃)₂ | —CH₂CH₂CH₂CH₂N(CH₃)₂ |
| 9. | CH₃NHCH₂CH₂—NH₂ | CH₃NHCH₂CH₂— |
| 10. | (CH₂=CHCH₂)₂NCH₂CH₂NH₂ | (CH₂=CHCH₂)₂NCH₂CH₂— |
| 11. | [pyrrolidine]N—(CH₂)₃NH₂ | [pyrrolidine]N—(CH₂)₃— |
| 12. | CH₂=CH—CH₂NH₂ | CH₂=CH—CH₂— |
| 13. | (CH₂)ₓN—(CH₂)₃NH₂ | (CH₂)ₓN—(CH₂)₃— |
| 14. | [piperidine]N—(CH₂)₂NH₂ | [piperidine]N—(CH₂)₂— |
| 15. | HN[piperazine]N—(CH₂)₂NH₂ | HN[piperazine]N—(CH₂)₂— |

— Continued

| | | | |
|---|---|---|---|
| 16. | 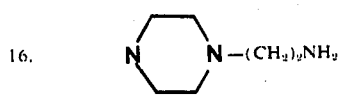 | | 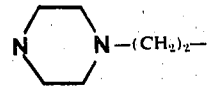 |
| 17. | 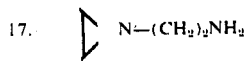 | | 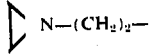 |
| 18. | 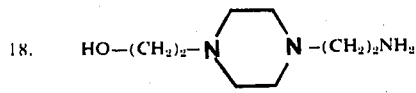 | | 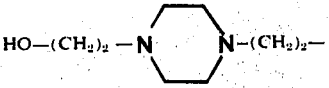 |
| 19. | 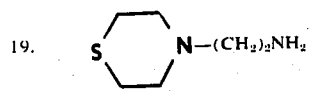 | | 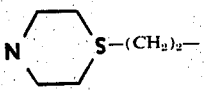 |

The difluoro analogs are represented by formula VII. Difluorocarbene can be generated by reaction of trimethyltrifluoromethyltin or phenyltrifluoromethylmercury with sodium iodide in 1,2-dimethoxyethane at 80°C and reacted with 5H-dibenzo[a,d]cyclohepten-6-ones to yield the 1,1-difluoro analogs of Formula III. Subsequent reaction of the 1,1-difluoro-1,1a,6,10b-tetrahydrodibenzo[a,e]cyclopropa[c]cyclohepten-6-ones with the amines in column 1 of Table IV gives imines of formula VII where $R^5$ is as shown in Table V.

TABLE V $R^5$

1. $CH_3$—
2. ▷$CH_2$—
3. (piperidinyl)—$(CH_2)_2$—
4. (morpholinyl)—$(CH_2)_2$—
5. $HOCH_2CH_2$—
6. $HO(CH_2)_3$—
7. $CH_3CH(CH_2)_3N(C_2H_5)_2$
8. $(CH_3)_2N(CH_2)_3$—
9. $CH_3NH$—$(CH_2)_2$—
10. $(CH_2=CHCH_2)_2N(CH_2)_2$—
11. (pyrrolidinyl)—$(CH_2)_3$—
12. $CH_2=CH$—$CH_2$—
13. $(CH_3)_4N$—$(CH_2)_3$—
14. (piperidinyl)—$(CH_2)_2$—
15. HN(piperazinyl)—$(CH_2)_2$—
16. $CH_3$N(piperazinyl)—$(CH_2)_2$—
17. ▷N—$(CH_2)_2$—
18. $HO(CH_2)_2$—N(piperazinyl)—$(CH_2)_2$—
19. (thiomorpholinyl)—$(CH_2)_2$—

The 1,1a,6,10b-tetrahydrodibenzo[a,e]cyclopropa[c]cyclohepten-6-one (B) used above can be prepared as follows:

1. 1,1-Dichloro-1,1a,6,10b-tetrahydrodibenzo[a,e]cyclopropa[c]cyclophepten-6-dimethylketal (C)

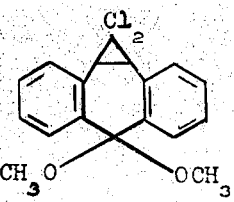

C

A mixture of 23 g (0.08 mole) of 1,1-dichloro-1,1a,6,10b-tetrahydrodibenzo[a,e]cyclopropa[c]cyclophepten-6-one (A), 21 g of phosphorus pentachloride and 80 ml of phosphorus oxychloride was heated at reflux for 4 hours. The solvent was evaporated under vacuum, then 15 ml of toluene was added and evaporated. This procedure was repeated twice, and the residue was held at 60°, 1 mm for 0.5 hour. To the cooled solid, 140 ml of dry methanol was added and the mixture refluxed. To this solution 10 g of sodium methoxide in 60 ml of methanol was added and the solution refluxed for 28 hours. The mixture was poured into 500 ml of water and the precipitate extracted with ether. The organic solution was washed with water, dried, and the solvent evaporated. Recrystallization from isopropyl alcohol gave 20.9 g (78%) of product (C), mp 150°–151°. NMR spectrum (in $CDCl_3$): multiplet at δ 6.9–7.7 (8H), two singlets at 3.3 and 3.4 (5H) and singlet at 3.1 (3H).

Anal. Calcd for $C_{18}H_{16}Cl_2O_2$: C, 64.49; H, 4.81; Cl, 21.15; Found: C, 64.87; H, 4.82; Cl, 20.78

2. 1,1a,6,10b-Tetrahydrodibenzo[a,e]cyclopropa[c]cyclohepten-6-dimethylketal (D)

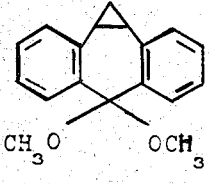

D

A stirred mixture of 113 of 1,1-dichloro-1,1a,6,10b-tetrahydrodibenzo[a,e]cyclopropa[c]cyclohepten-6-dimethylketal (C), 1 liter of dry hexamethylphosphoramide, 11 g of lithium hydride and 48 ml of triethylborane was heated on the steam bath for 12 hours. To the cooled mixture, 200 ml of ethanol was added and stirred for 1 hour at 25°C, then on the steam bath for 0.5 hours. After cooling the mixture to 25°, 200 ml of water was cautiously added, then poured into 8 liters of water, and the oil was extracted into ether. The combined ether layers were thoroughly washed with saturated sodium chloride solution, dried and the solvent evaporated. The residue was flash distilled at 125°–140° (30 μ). The oil was solidified by the addition of methanol. Recrystallization from methanol gave 36.5 g of product. A second crop of 2.6 g was obtained by the concentration of the mother liquor. The total was 39.1 g (43.5% of theory) of 1,1a,6,10b-tetrahydrodibenzo[a,e]cyclopropa[c]cyclohepten-6-dimethylketal (D).

The nmr spectrum (in $CDCl_3$): multiplet at δ 6.9–7.7 (8H), singlet at 3.5 (3H), singlet at 3.2 (3H), multiplet at 2.3–2.7 (2H), multiplet at 1.2–1.6 (1H) and multiplet at 0.3–0.7 (1H).

Anal. Calcd for $C_{18}H_{18}O_2$: C, 81.17; H, 6.80; Found: C, 81.27; H, 6.80

3. 1,1a,6,10b-Tetrahydrodibenzo[a,e]cyclopropa[c]cyclohepten-6-one (B)

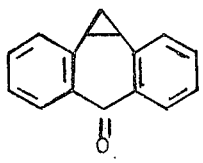

B

A solution of 39 g of 1,1a,6,10b-tetrahydrodibenzo[a,e]cyclopropa[c]cyclohepten-6-dimethylketal (D), 440 ml of acetone and 25 ml of 0.5M perchloric acid was held at 25°C for 20 hours. The solvent was removed on a rotary evaporator at 25°C and the residue was dissolved in ether and the layers were separated. The ether layer was washed with water, saturated sodium bicarbonate solution and again with water, dried and the solvent removed. Recrystallization from methanol gave 26.8 g of product. A second crop of 1.7 g was obtained by concentration of the mother liquor. The total yield was 27.5 g (85.5% of theory) of 1,1a,6,10b-tetrahydrodibenzo[a,e]cyclopropa[c]cyclohepten-6-one, mp 89°. The nmr spectrum (in $CDCl_3$): multiplet at δ 7.0–7.8 (8H), multiplet at 1.8–2.8 (3H) and multiplet at 0.3–0.7 (1H).

Another process for the preparation of 1,1a,6,10b-tetrahydrodibenzo[a,e]cyclopropa[c]cyclohepten-6-one (B) is the addition of dichlorocarbene to the commercially available 5H-dibenzo[a,d]cyclohepten-5-one by the method described in U.S. 3,547,933 to give 1,1-dichloro-1,1a,6,10b-tetrahydrodibenzo[a,e]cyclopropa[c]cyclohepten-6-one. Treatment of this dichloroketone with $POCl_3$–$PCl_5$ followed by sodium methoxide in methanol gives 1,1-dichloro-1,1a,6,10b-tetrahydrodibenzo[a,e]cyclopropa[c]cyclohepten-6-dimethylketal (C). Replacement of both the chlorine atoms with hydrogen is effected by reaction with lithium hydride-triethylborane (lithium triethylborohydride) in hexamethylphosphoramide to give 1,1a,6,10b-tetrahydrodibenzo[a,e]cyclopropa-[c]cyclohepten-6-dimethylketal (D). Treatment of this ketal with acid yields 1,1a,6,10b-tetrahydrodibenzo[a,e]cyclopropa[c]cyclohepten-6-one (B). The reaction of this ketone with amines gives N-(substituted)-1,1a,6,10b-tetrahydrodibenzo[a,e]cyclopropa[c]cyclohepten-6-imines of this invention. An advantage of this synthesis is retention of any halogen on the benzene ring.

Replacement of one chlorine of 1,1-dichloro-1,1a,6,10b-tetrahydrodibenzo[a,e]cyclopropa[c]cyclohepten-6-dimethylketal (C) with hydrogen is effected with lithium aluminum hydride to give 1-chloro-1,1a,6,10b-tetrahydrodibenzo[a,e]cyclopropa[c]cyclohepten-6-dimethylketal, which is then converted to 1-chloro-1,1a,6,10b-tetrahydrodibenzo-[a,e]cyclopropa[c]cyclohepten-6-one by treatment with acid. The reaction of this ketone with amine gives the N-(substituted)-1-chloro-1,1a,6,10b-tetrahydrodibenzo[a,e]cyclopropa[c]cyclohepten-6-imines.

EXAMPLE A

A sample of 0.1 g of N-(2-dimethylaminoethyl)-1,1-dichloro-1,1a,6,10b-tetrahydrodibenzo[a,e]cyclopropa[c]cyclopehten-6-imine (Ex. 1) was dissolved in 2 ml of a solution containing 10% by weight of polyvinyl chloride ("Vygen" 110) in tetrahydrofuran. The film cast from this solution is plasticized and is flexible and tough. A film cast from a solution containing only polyvinyl chloride and tetrahydrofuran is stiff and brittle.

EXAMPLE B

Following the procedure of Example A, N-(3-dimethylaminopropyl)-1,1-dichloro-1,1a,6,10b-tetrahydrodibenzo[a,e]cyclopropa[c]cyclohepten-6-imine (Ex. 2) was also shown to be effective as a plasticizer for polyvinyl chloride.

Many of these substituted imino compounds especially those having no halogen substituents in the 1-position, show activity in the mammalian central nervous system. The product of Example 3, N-(2-dimethylaminoethyl)-1,1a,6,10b-tetrahydrodibenzo[a,e]cyclopropa[c]cyclohepten-6-imine, shows anti-depressant activity in rats.

The compounds of this invention can be administered as treatment for psychiatric depressions of the reactive and endogenous types by any means that effects contact of the active ingredient compound with the site of action in the body of a warm-blooded animal. For example, administration can be parenterally, i.e., subcutaneously, intravenously, intramuscularly or intraperitoneally. Alternatively or concurrently, administration can be by the oral route.

The dosage administered will be dependent upon the age, health and weight of the recipient, the type and severity of depression, kind of concurrent treatment, if any, frequency of treatment and the nature of the effect desired. Generally a daily dosage of active ingredient compound will be from about 0.01 to 50 mg/kg of body weight. Ordinarily, from 0.05 to 40 and preferably 0.1 to 20 mg/kg per day in one or more applications per day is effective to obtain desired results. For the product of Example 3, N-(dimethylaminoethyl)-1,1a,6,10b-tetrahydrodibenzo[a,e]cyclopropa[c]cyclohepten-6-imine, the daily dosage ranges are from about 0.01 to 20 mg/kg, preferably 0.05 to 10 mg/kg, and more preferably 0.1 to 5 mg/kg.

The antidepressant activity of the compounds of the invention was evidenced by tests conducted in female white mice in which prevention of tetrabenazine-induced sedation and depression was demonstrated. This mouse test is predictive of human antidepressant response (Everett, G. M., "The Dopa Response Potentiation Test and Its Use in Screening for Antidepressant Drugs", pp. 164–167 in "Antidepressant Drugs" [Proceedings of the First International Symposium], S. Garattini and M. N. G. Dukes, eds., 1967).

EXAMPLE C

Groups of 10 Carworth $CF_1S$ female mice, 18–21 g each, were fasted 1.5 hours and were intubated with antagonist at oral doses of 5, 25, and 125 mg/kg in 0.20 ml of 1% Methocel. The mice were challenged 30 minutes later with tetrabenazine, 32 mg/kg intraperitoneally (dissolved in 0.20 ml 0.05M KCl at pH 2.0). One hour after antagonist (30 minutes after tetrabenazine), the mice were examined for signs of exploratory activity and ptosis (eyelid closure). Normal exploratory activity (relief from sedation) was recorded when a mouse lifted by the tail from a group of 10 in a testing box and placed on a stainless steel testing box lid (12.5 × 8 × 0.33 inch mesh) either turned its head horizontally 30° or moved to the edge of the screen within 10 seconds after being placed on the screen. Relief from ptosis was recorded when exactly 2 seconds after placing the mouse facing the observer, lid closure was less than 50% in both eyes.

The test showed that N-(2-dimethylaminoethyl)-1,1a,6,10b-tetrahydrodibenzo[a,e]cyclopropa[c]cyclohepten-6-imine (Ex. 3) is potent in preventing tetrabenazine-induced sedation and depression in mice. It was determined also that this compound when given orally at less than 5 mg/kg, blocked the tetrabenazine effects in 50% of the animals, i.e., the antidepressant $ED_{50}$ was less than 5 mg/kg.

The embodiments of the invention in which an exclusive property or privilege is claimed are defined as follows:

1. A compound of the formula

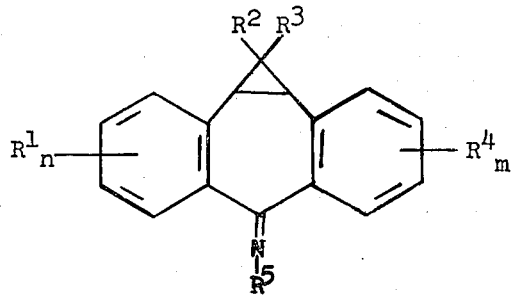

wherein
$R^1$ and $R^4$, alike or different, are selected from F, Cl, Br, alkyl and alkoxy of 1 through 4 carbon atoms, hydroxy, trifluoromethyl, methylthio, N,N-dimethylsulfonamido and methylsulfonyl;

$m$ and $n$ are 0, 1 or 2;

$R^2$ and $R^3$, alike or different, are selected from H, F, Cl, and Br; and $R^5$ is aminoalkyl of the formula $-(CH_2)_pNR^6R^7$ in which $p$ is 1 through 5, and $R^6$ and $R^7$, are individually selected from H, alkyl, alkenyl and hydroxyalkyl, or together with the nitrogen, form a 4- to 9-membered ring having up to one additional heteroatom N, O or S, with the proviso that the sum of $R^6$ and $R^7$ does not total more than 8 carbon atoms.

2. A compound according to claim 1 in which one of $R^1$ and $R^4$ is hydrogen.

3. A compound according to claim 1 in which $R^2 = R^3 = H$.

4. A compound according to claim 1 in which $m = n = o$, $R^2 = R^3 = H$ and $R^5 = CH_2CH_2NHCH_3$; N-(2-methylaminoethyl)-1,1a,6,10b-tetrahydrodibenzo[a.e.]cyclopropa[c]cyclohepten-6-imine.

5. A compound according to claim 1 in which $m = n = o$, $R^2 = R^3 = Cl$ and $R^5 = (CH_2)_2N(CH_3)_2$; N-(2-dimethylaminoethyl)-1,1-dichloro-1,1a,6,10b-tetrahydrodibenzo[a,e]cyclopropa[c]cyclohepten-6-imine.

6. A compound according to claim 1 in which $m = n = o$, $R^2 = R^3 = Cl$ and $R^5 = (CH_2)_3N(CH_3)_2$; N-(3-dimethylaminopropyl)-1,1-dichloro-1,1a,6,10b-tetrahydrodibenzo[a,e]cyclopropa[c]cyclohepten-6-imine.

7. A compound according to claim 1 in which $m = n = o$, $R^2 = R^3 = H$ and $R^5 = (CH_2)_2N(CH_3)_2$; N-(2-dimethylaminoethyl)-1,1a,6,10b-tetrahydrodibenzo[a,e]cyclopropa[c]cyclohepten-6-imine.

8. A compound according to claim 1 in which $m = n = o$, $R^2 = R^3 = H$, and $R^5 = (CH_2)_3N(CH_3)_2$; N-(3-dimethylaminopropyl)-1,1a,6,10b-tetrahydrodibenzo[a,e]cyclopropa[c]cyclohepten-6-imine.

9. A compound according to claim 1 in which $m = n = o$, $R^2 = R^3 = H$, and $R^5 = (CH_2)_3NHCH_3$; N-(3-methylaminopropyl)-1,1a,6,10b-tetrahydrodibenzo[a,e]cyclopropa[c]cyclohepten-6-imine.

* * * * *